(12) United States Patent
Stellnert et al.

(10) Patent No.: US 7,607,404 B2
(45) Date of Patent: Oct. 27, 2009

(54) VACUUM SYSTEM COMMUNICATION

(75) Inventors: Mats Stellnert, Farsta (SE); Richard T. Meyer, Kansas City, MO (US)

(73) Assignee: Delaval Holding AB, Tumba (SE)

( * ) Notice: Subject to any disclaimer, the term of this patent is extended or adjusted under 35 U.S.C. 154(b) by 346 days.

(21) Appl. No.: 10/495,172

(22) PCT Filed: Apr. 24, 2002

(86) PCT No.: PCT/SE02/00800

§ 371 (c)(1),
(2), (4) Date: Jun. 21, 2005

(87) PCT Pub. No.: WO03/045133

PCT Pub. Date: Jun. 5, 2003

(65) Prior Publication Data

US 2005/0274326 A1 Dec. 15, 2005

Related U.S. Application Data (60) Provisional application No. 60/333,926, filed on Nov. 28, 2001.

(51) Int. Cl.
*A01J 5/007* (2006.01)
(52) U.S. Cl. .................. 119/14.08; 119/14.14
(58) Field of Classification Search .............. 119/14.01, 119/14.02, 14.08, 14.14, 14.18, 14.43
See application file for complete search history.

(56) References Cited

U.S. PATENT DOCUMENTS

| | | | |
|---|---|---|---|
| 4,011,838 A | 3/1977 | Nordegren et al. | |
| 5,141,403 A | 8/1992 | Guo et al. | |
| 5,284,180 A | 2/1994 | Guo et al. | |
| 5,845,599 A | 12/1998 | Bova et al. | |
| 5,860,388 A | 1/1999 | Tan et al. | |
| 5,960,736 A | 10/1999 | Ludington et al. | |
| 6,045,331 A | 4/2000 | Gehm et al. | |

(Continued)

FOREIGN PATENT DOCUMENTS

EP      0 679 331      11/1995

(Continued)

OTHER PUBLICATIONS

D.R. Bray et al., "An Automated System for Monitoring Milking System Parameters," *Proc. 4th Int'l Dairy Housing Conf.*, pp. 14-22 (1998).

*Primary Examiner*—T. Nguyen
(74) *Attorney, Agent, or Firm*—Harness, Dickey & Pierce, P.L.C.

(57) ABSTRACT

An automatic milking system having a vacuum pump arrangement, the automatic milking system includes a milking system controller arranged to control milking system parameters and a vacuum pump arrangement having a vacuum system controller for controlling vacuum system parameters. Communication means is coupled to the vacuum system controller and to the milking system controller for establishing communication between the vacuum system controllers and the milking system controller. The milking system controller has signal transmitting means for transmitting a message to the vacuum system controller. The vacuum system controller has signal receiving means for receiving the message from the milking system controller, and the vacuum system controller is arranged to change a least one of the vacuum system parameters depending on the received message.

22 Claims, 5 Drawing Sheets

U.S. PATENT DOCUMENTS 6,148,766 A * 11/2000 van der Lely ............ 119/14.08

FOREIGN PATENT DOCUMENTS

| EP | 0 727 137 | 8/1996 |
|---|---|---|
| EP | 0900940 A2 | 9/1998 |
| EP | 0 954 962 | 11/1999 |
| GB | 2 218 888 | 11/1989 |
| WO | WO 96/36213 | 11/1996 |
| WO | WO 00/18218 | 4/2000 |
| WO | WO 01/19169 | 3/2001 |

* cited by examiner

Fig 5

VACUUM SYSTEM COMMUNICATION

CROSS-REFERENCE TO RELATED APPLICATIONS

This application is a National Stage Entry of PCT Application number PCT/SE02/00800 filed on Apr. 24, 2002 and claims priority under 35 U.S.C. § 119 and/or 120 to U.S. Provisional Application No. 60/333,926 filed on Nov. 28, 2001.

TECHNICAL FIELD

The present invention relates to controlling vacuum system parameters in an automatic milking system. More particularly, the invention relates to increased energy efficiency, as well as increased reliability and more stable operation of a vacuum system in an automatic milking system.

BACKGROUND OF THE INVENTION

A milking system is one of the most important components on a dairy farm, for it is used more hours per year than any other type of equipment. A key component of a milking system is a vacuum pump, which is used to remove air from the milking system pipelines to create a partial vacuum. In a conventional vacuum milking system, the vacuum pump runs at full speed all the time, regardless of air demands. A vacuum regulator is generally used to regulate the desired vacuum level by admitting external air, as required, when the vacuum level reaches a predetermined setting. The nominal vacuum levels normally used for milking usually are selected to be in the range from 40 to 50 kPa, but vacuum fluctuations can occur in the system, as when a milking unit falls off the cow being milked, or when the system develops an air leak. It is essential that such fluctuations be limited to enable the vacuum system to meet ASAE standards as well as other standards. This is difficult to achieve, because such incidents can cause airflow in the system to increase over what is needed when the system is operating properly. To compensate for such variations, the size of the vacuum pump is selected to provide the desired vacuum level even when there is a large amount of leakage, and the vacuum regulator compensates vacuum fluctuations. Thus, for example, a vacuum pump operates at a constant rate sufficient to maintain a predetermined vacuum level in a reservoir even under leakage conditions, and a vacuum regulator connected to the reservoir admits air as required to control the vacuum level during normal operating conditions.

In such prior systems, if there is an increase in airflow through the milking system, airflow through the vacuum regulator is reduced so that the reservoir maintains the required vacuum level in the milking line. Ideally, in such systems, increases in the airflow in the milking system should result in decreases in the airflow through the regulator, and these should be about equal to cancel each other and to maintain vacuum equilibrium in the reservoir. The problem with this arrangement is that only a small portion of the vacuum pump capacity is actually needed for milking, with majority of the airflow passing through the regulator. In such arrangements, the capacity of the vacuum pump always exceeds the capacity needed to milk cows or to wash the milking system, and the pump always runs at full speed and full load, regardless of the actual need for vacuum.

Particularly, for modern automatic robotic milking systems, where animals may visit the automatic milking machine at will, the vacuum need may vary substantially over time, not only due to leakage or other incidents, but also for the reason that animals arrive at irregular intervals to the automatic milking system.

A recent improvement over the foregoing conventional system is described in U.S. Pat. No. 5,284,180, which discloses a system for varying the speed of a vacuum pump to maintain the required, vacuum level and stability in the system. In this patent, a vacuum level controlling system utilizes a two-level controller combined with an adjustable speed motor drive for the pump.

U.S. Pat. No. 5,960,763 describe a system and method, which supplies different vacuum levels depending on if the milking machine, is in washing or milking mode. It is possible to select which mode should be used at any time.

None of the above patents concerns the specific problems associated with robotic milking systems, e.g. animals arriving at irregular intervals to be milked.

A further problem is how to achieve better surveillance and monitoring of the workings of the vacuum pump system.

There is, therefore, a need for an automatic control system, for a vacuum pump in a milking system to provide an improved vacuum control system, for reducing electrical energy consumption, which will meet the needs of modern dairy farms.

SUMMARY OF THE INVENTION

It is a main object of the present invention to provide such apparatus and method that reduces the electrical energy consumed in an automatic milking system.

It is in this respect a particular object of the invention to provide such apparatus and method that adapts the supplied vacuum level to the immediate or near immediate vacuum need as required by an automatic milking system.

It is still a further object of the invention to provide such apparatus and method that enables a milking system controller to command a vacuum system controller to set a specific vacuum level.

It is another object of the invention to provide such an apparatus and method that enables communication between a vacuum pump arrangement and an automatic milking system controller.

These objects among others are, according to a first aspect of the present invention, attained by an automatic milking system comprising a vacuum pump arrangement. The automatic milking system comprises a milking system controller arranged to control milking system parameters and the vacuum pump arrangement comprises a vacuum system controller for controlling vacuum system parameters. The system further comprises communication means coupled to the vacuum system controller and to the milking system controller for establishing communication between the vacuum system controller and the milking system controller, and the milking system controller comprises signal transmitting means (108; 514) for transmitting a message to said vacuum system controller. The vacuum system controller comprises signal receiving means (107; 513) for receiving said message from said milking system controller, and the vacuum system controller is arranged to change at least one of said vacuum system parameters depending on said received message.

The automatic milking system may further comprise, according to a preferred embodiment of the invention, signal transmitting means, arranged in the vacuum system controller for sending a message relating to at least one of the vacuum parameters to the milking system controller, and the milking system controller thus comprises signalling receiving means (108; 514) for receiving said message.

These objects among others are attained, according to a second aspect of the present invention, by a method for controlling and monitoring a vacuum pump arrangement for supplying vacuum to an automatic milking system, wherein the vacuum pump arrangement comprises a vacuum system controller for controlling vacuum system parameters relating to said vacuum system and the automatic milking system comprises a milking system controller for controlling milking system parameters relating to said automatic milking system. The method comprises the steps of sending a message from the milking system controller to the vacuum system controller, using a communications means coupling the milking system controller to the vacuum system controller, and changing, by means of the vacuum system controller, at least one of the vacuum system parameters, in dependence of said received message.

The method may further comprise, according to a preferred embodiment of the invention the further steps of detecting a vacuum system parameter by the vacuum system controller, and sending the detected vacuum system parameter from the vacuum system controller to the milking system controller, using said communications means coupling said milking system controller to said vacuum system controller.

Thereby, the milking system controller may read milking system parameters, such as measured vacuum level in the milking system, for instance, in a milking conduit or at an end unit, and compare these with vacuum system parameters, such as a vacuum level as reported by the vacuum system controller. If the two measured vacuum levels, i.e. the milking system vacuum level and the vacuum system vacuum level, deviate more than a value, a fault may be reported, or the milking system controller may command the vacuum system controller to increase the supplied vacuum, whereby the vacuum system controller typically will increase the speed of a vacuum pump motor by means of a VSD (Variable Speed Drive).

The milking system parameters may also include such parameters that relate to the current status of the milking system, or parts of the milking system. Such parameters may for instance be the identification of an animal to be milked, if a specific gate is opened or closed (which could indicate that one or several animals are soon going to be milked), the identification of an animal to be milked, for which a specific procedure will be applied which requires an increased vacuum level or which procedure increases the air inlet, such as a more demanding washing procedure. Other parameters could be that no vacuum is needed for the moment in which case the vacuum controller typically would turn of the vacuum pump or set the vacuum pump to maintain a stand-by vacuum level, which is lower than the vacuum levels required for teat cleaning and milking and thus substantially less energy requiring.

An advantage of the present invention is that energy savings is obtained in an automatic milking system.

A further advantage is that better surveillance is obtained over the function of the vacuum pump system.

Yet a further advantage is that control is achieved over the vacuum pump system by the automatic milking system.

A further advantage of the present invention is that an even vacuum level with few fluctuations can be achieved in the milking system when the vacuum system controller is instructed to raise the vacuum before the need for higher vacuum levels arise.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given herein below and the accompanying FIGS. 1 to 5, which are given by way of illustration only, and thus are not limitative of the present invention.

PREFERRED EMBODIMENTS

In the following description, for purposes of explanation and not limitation, specific details are set forth, such as particular techniques and applications in order to provide a thorough understanding of the present invention. However, it will be apparent to one skilled in the art that the present invention may be practiced in other embodiments, which depart from these specific details. In other instances, detailed descriptions of well-known methods and apparatuses are omitted so as not to obscure the description of the present invention with unnecessary details.

Figure 1:
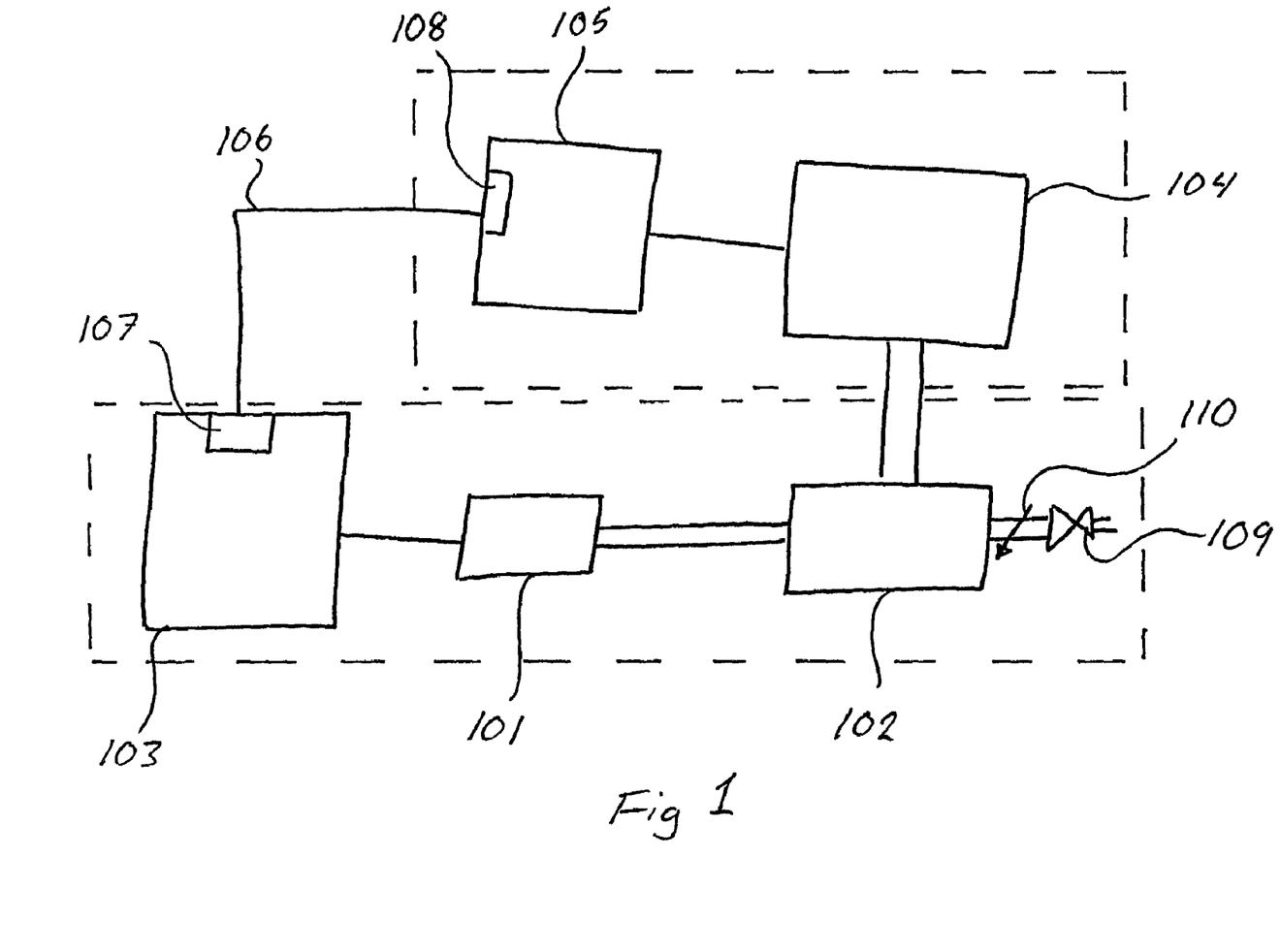
FIG. 1 shows a schematic drawing of an automatic milking system and a vacuum pump system according to a preferred embodiment of the invention.

FIG. 1 shows a schematic diagram of a device according to the present invention. A vacuum pump arrangement 101 is connected to a vacuum ballast or distribution tank 102. A vacuum system controller 103 controls the vacuum pump arrangement 101 including a VSD (Variable Speed Drive) (not shown) controlling a motor (not shown). The ballast tank 102 is in turn connected to an automatic milking system 104, having a milking system controller 105.

The milking system controller 105 is a computer system controlling the operation of the automatic milking system 104, such as identifying an animal using a conventional identification system (not shown), measuring the collected milk and/or milk flow from an animal, initiating take-off of teat cups when the milk flow has ceased etc.

For an automatic milking system comprising an automatic robot additional milking system parameters have to be regarded such as deciding if an identified animal is accepted for milking, opening gates, initiating teat cup application etc.

The vacuum system controller 103 is connected to the milking system controller 105 by means of a connection means 106. The connection means 106 can be any of a multitude of different message carrying media, such as Ethernet Lan, Wireless Lan or even the Internet or as simple as ordinary copper wires. The important aspect is that the vacuum system controller comprises transceiver means 107 capable of sending and receiving messages to a transceiver 108 in the milking system controller thereby allowing communication between said vacuum system controller and said milking system controller. The communication, as such, is performed in a conventional manner well known to one skilled in the art.

A regulation valve 109 leaks air into the milking system if the vacuum levels are to high, thus keeping the vacuum level below a maximum level. A shut-off valve 110 may be used to disconnect the regulation valve 109, should so be desired, e.g. during washing of the milking system.

Figure 2A:
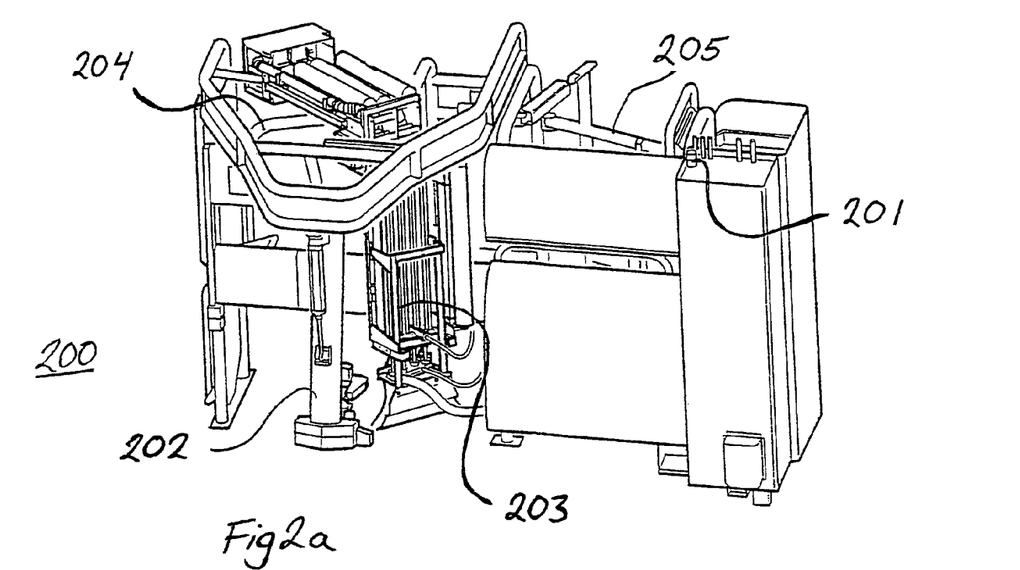
FIGS. 2a and 2b show two different views in more detail of the automatic milking system in FIG. 1 comprising an automatic robotic milking system according to a preferred embodiment of the invention.
Figure 2B:
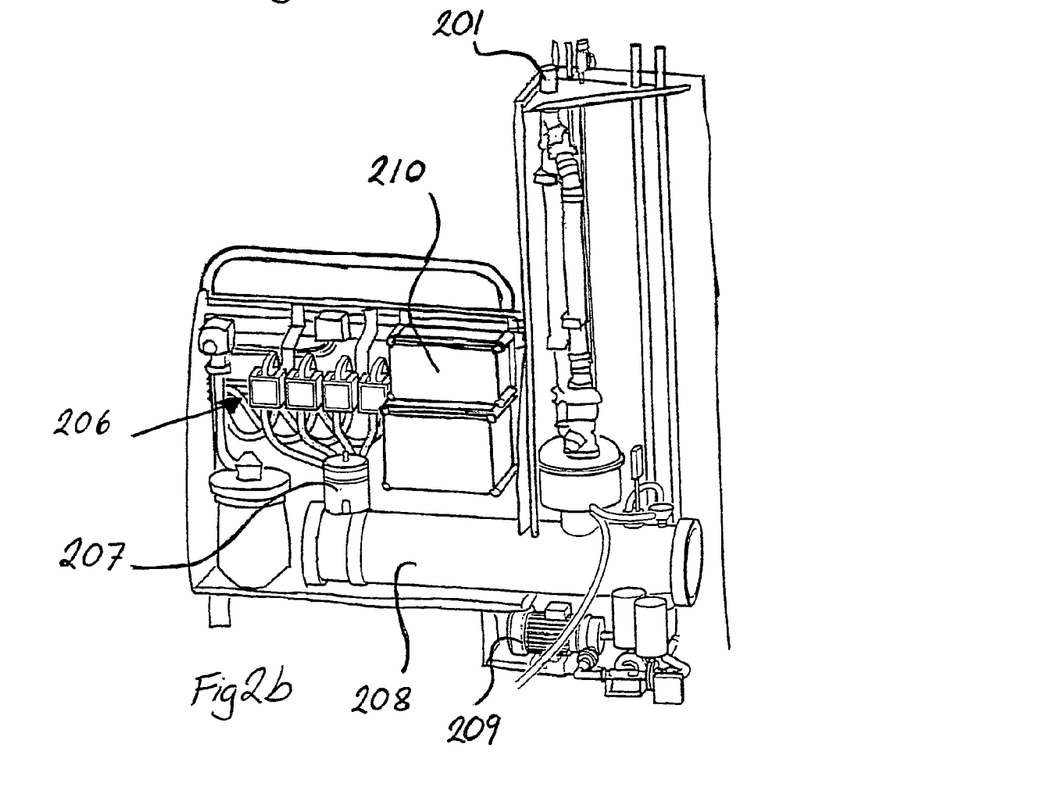

FIGS. 2a and 2b show the automatic milking system 104 in FIG. 1 in greater detail in a preferred embodiment employing a robotic milking machine. An ARMS (Automatic Robotic Milking System) 200 is shown in FIG. 2a. A main vacuum supply line 201 is connected through a vacuum line (not shown) to vacuum ballast tank 102. The ARMS further comprises a robotic arm 202 for connecting teat cups and a washing cup, commonly denoted 203, to the teats of an animal. The ARMS 200 further comprises an inlet gate 204 and an outlet gate 205.

In FIG. 2b parts of the ARMS in FIG. 2a are shown in greater detail. Four milk flow meters 206 measure the milk flow from each teat individually and a fifth milk meter 207 measure the collected milk from all of the four teats together. A receiver tank 208 collects the milk for later transport to a milk tank by means of a milk pump 209. All the devices shown, i.e. the robot arm 202, the teat cups and the washing cup 203, the inlet gate 204, the outlet gate 205, the milk flow meters 206, the milk meter 207, the receiver tank 208 and the milk pump 209, as well as many more features not specifically mentioned but included in a conventional ARMS, such as valves, compressed air, pistons etc, are controlled by an ARMS controller 210.

Figure 3:
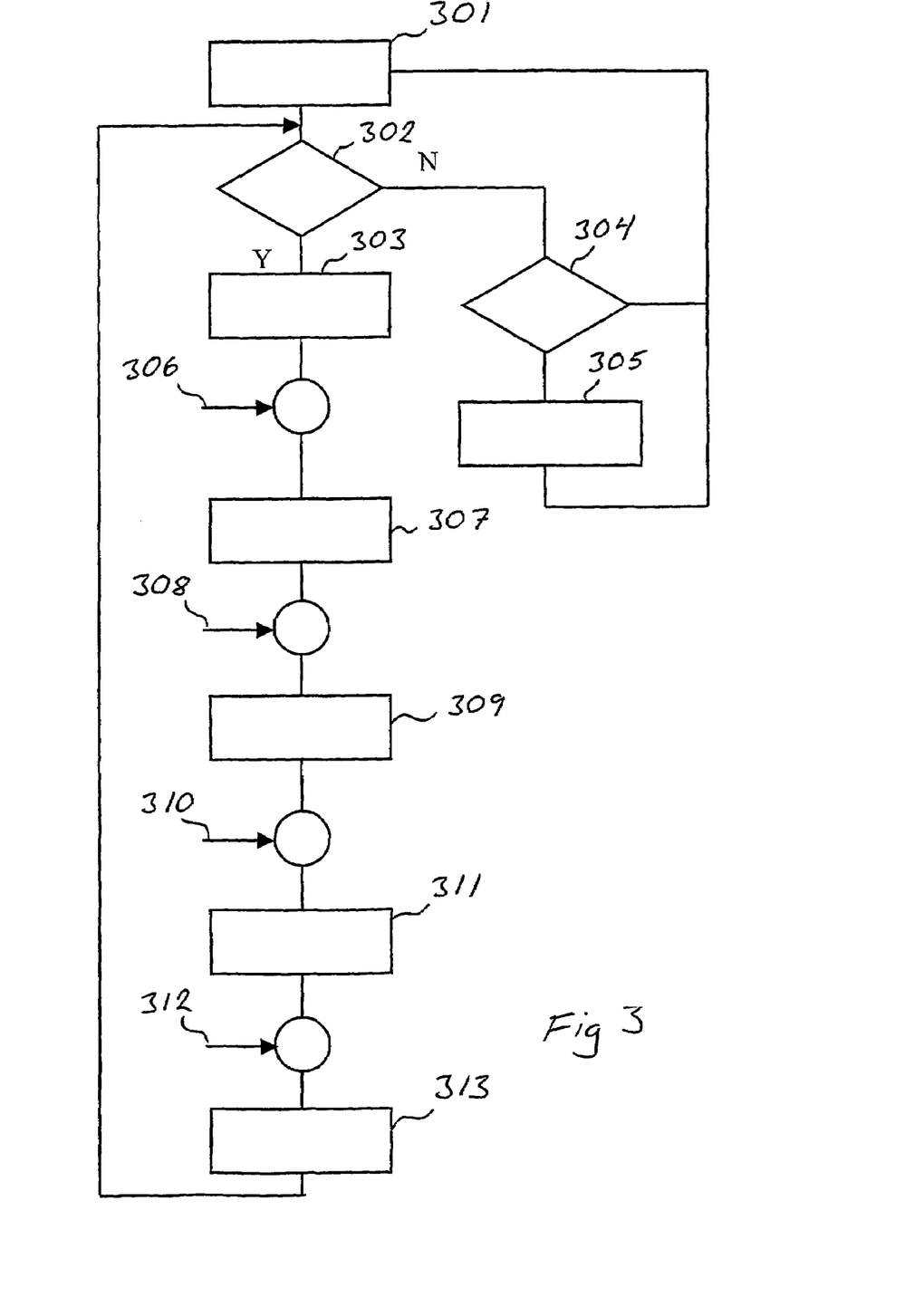
FIG. 3 shows schematic flow diagram according to a preferred embodiment of the invention.

FIG. 3 shows a flow diagram of a preferred embodiment according to the invention describing one of the processes of the invention in an ARMS (automatic robotic milking system). The milking system detects and identifies 301 an animal wanting access to the ARMS. Normally, the sequence to be followed for an animal to be milked is to first clean the teats of the animal by means of a washing cup, applying the milking cups, monitoring the milk flow from all and/or each of the teats, removing the teat cups, disinfecting the teats and finally washing the teat cups, milk lines and other equipment used.

If the animal is allowed for milking 302 the ARMS controller 105 sends a message 303 to the VSC (vacuum system controller) 103, commanding the VSC to set a particular vacuum level by adjusting the speed, i.e. in revolutions per minute, of the motor, by means of the VSD, to a teat cleaning value. By increasing the speed of the motor driving the vacuum pump a higher vacuum level will be achieved. However, when a certain vacuum level, e.g. 50 kPa, has been reached the regulation valve 109 in FIG. 1 will start to leak air so as to keep the vacuum level from reaching to high levels.

During teat cleaning the leakage of air into the vacuum system is larger than during, for instance milking, i.e. more vacuum is needed and the speed of the vacuum pump motor is thus set accordingly as described above. In this respect it would be advantageous to send the message somewhat before the actual teat cleaning sequence is performed so that the vacuum system is given time to adjust the vacuum level accordingly to avoid vacuum level fluctuations.

In prior art systems the vacuum level would sink with increased inflow of air. A sensor would notice the situation and an order would be issued to increase the speed of the vacuum pump motor to again achieve the correct vacuum level, e.g. the milking vacuum level. However, during a period the vacuum level will drop and may fluctuate before equilibrium is achieved. This is undesirable.

Generally, the term "increased vacuum need" most often refer to a situation with an increased influx of air and with requirements to maintain constant vacuum. To balance the air inlet the vacuum pump motor need to increase its speed to displace to increased amount of air so as to maintain the vacuum level.

When ordering increased speed of the motor, a higher vacuum is eventually built up, however this may take a short time depending on the need for the motor to reach the correct speed, time for vacuum build up etc. If the speed is increased exactly at the same time as the need for increased vacuum arises, that is for instance when a specific operation allowing an increased inflow of air into the milk line, such as teat cleaning, is to take place, the vacuum level will fluctuate before an equilibrium is achieved. These fluctuations are undesirable. However, if the order is given to the motor beforehand it will speed up to a speed known to give an adequate vacuum level during a relevant operation, in this case, a teat cleaning operation. Vacuum is gradually built up in the vacuum ballast tank and eventually the regulation valve 109 will let air into the tank to maintain the vacuum level at an acceptable level as discussed above. When the actual need for vacuum occurs, that is during teat cleaning, the valve 109 will close, since the teat cleaning causes increased inflow of air and the desired vacuum level is maintained with minimal vacuum fluctuations and low energy consumption since the vacuum pump can be set to work at a higher speed only when a need for more vacuum arises.

It is also advantageous if the vacuum system sends a message to the ARMS controller indicating that the correct vacuum level has been achieved. The ARMS controller may then check to see if the reported vacuum level corresponds to the vacuum level as measured by the ARMS. The process is then set into a sleep mode waiting for a trigger 306 indicating that teat cleaning has finished.

If the animal is not allowed into the ARMS, the ARMS controller checks 304 if a predetermined time have passed since the last animal was milked. If this is the case a message is sent 305 to the VSC to set the speed of the vacuum system motor to maintain a stand-by vacuum level, which is significantly lower than the normal milking vacuum level. Thus, energy is saved as soon as the ARMS is not used for milking. This check, if a predetermined time has passed since the last milking, is also continuously performed when no animals present themselves before the ARMS and a stand-by vacuum level is set if the check is true.

It would be equally possible to completely turn-off the vacuum pump, thus setting the vacuum level to atmospheric pressure.

This would save even more energy, however it is in some milking systems advantageous to keep a minimum vacuum level in the system to save sealing devices from fatigue, loosing their sealing effect etc.

When the ARMS controller indicates, by the trigger 306, that the teat cleaning sequence has ended or is soon to be ended, and a milking sequence, comprising a teat cup application phase and a milking phase, is about to start, a message is sent 307 to the VSC commanding the VSC to set the speed of the vacuum system motor to a teat cup application speed. In this respect it would be advantageously to send the message somewhat before the actual application of the teat cups is to be performed so that the vacuum system can adjust the vacuum level accordingly. During the teat cup application air inflow is increased and the vacuum pump motor speed is set accordingly. The process is then put to sleep waiting for a trigger 308 indicating the end of teat cup application and the start of the milking phase.

When the ARMS controller indicates, by the trigger 308, that the teat cup application phase has ended or is soon to be ended, a message is sent 309 to the VSC commanding the VSC to set the speed of the vacuum system motor to a milking vacuum speed corresponding to a milking vacuum level. This milking vacuum level can advantageously be individually set depending on the present animal to be milked but is normally set to 45 kPa. The process is then put to sleep waiting for a trigger 310 indicating the end of the milking phase or the soon end thereof.

When the ARMS controller indicates, by the trigger 310, that the milking phase has ended or is soon to be ended, a message is sent 311 to the VSC commanding the VSC to set the speed of the vacuum system motor to a washing vacuum speed. During washing of the teat cups, milk lines etc. it is normal that substantially more air is let into the system than during the milking of the animal. Thus it is advantageously to set the speed of the motor of the vacuum pump to a higher value somewhat before the actual washing starts as discussed above.

When the ARMS controller indicates, by the trigger 312, that the washing phase has ended or is soon to be ended, a message is sent 313 to the VSC commanding the VSC to set the speed of the vacuum system motor to maintain a stand-by vacuum level. This stand-by vacuum level corresponds to a significantly lower speed of the vacuum system motor. This stand-by vacuum level is suitable for the intermediate time when one animal leaves the ARMS and the next is to be allowed into the ARMS, or in wait for the next animal to arrive. Advantageously this level is 20 kPa but may be less to save even more energy. The process then continues at block 302.

By the arrangement described above, it is possible to adapt the required vacuum levels, to the individual animal, to achieve a better treatment of the animal, increase milk production and, at the same time, save consumed energy, since the vacuum pump is at all times made to work at the most economical level. Also the vacuum level may be adapted to situations where there is no apparent immediate need for the vacuum levels normally held during milking, such as when no animal is due to be milked or when no animal presents itself for milking, and thus the vacuum level may be lowered during these periods, resulting in less consumption of electrical energy, without any detrimental effects to the operation of the automatic milking machine.

Figure 4:
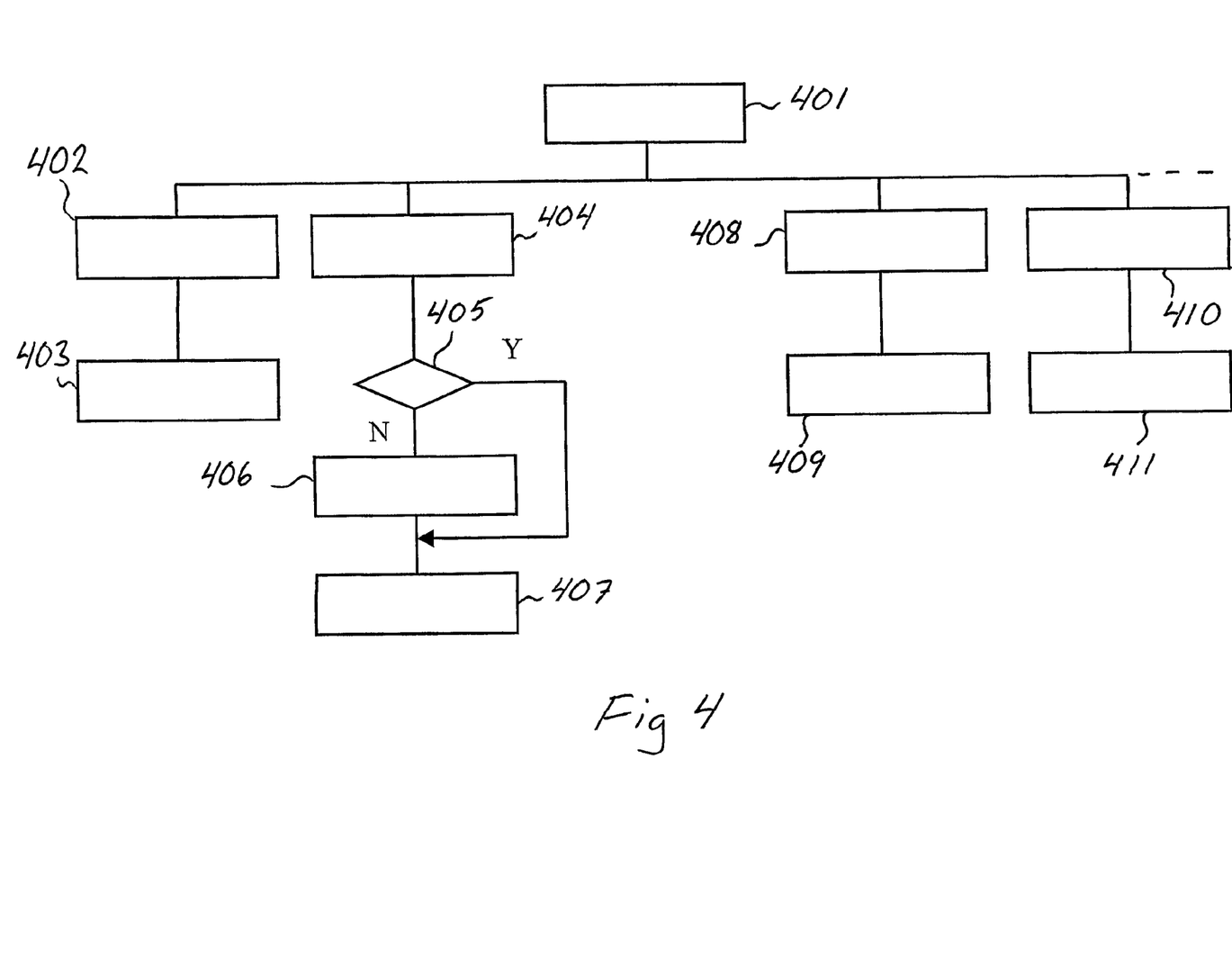
FIG. 4 shows another schematic flow diagram according to a preferred embodiment of the invention.

FIG. 4 shows a process in the ARMS receiving a message from the VSC. A message from the VSC is received 401 in the ARMS controller and appropriate measures is taken. Depending of the type of message a number of different actions may be performed. If the message is an error message 402 indicating a fault situation in the vacuum system, a fault is indicated 403 on a screen in the ARMS. Advantageously, an SMS (Short Message Service) message may also be sent to a predefined mobile number indicating the fault situation. If the message contains a measured value for a vacuum system parameter 404 a check is performed to see if the value is within allowed maximum and minimum values 405. If the value is not within the acceptable range a fault is indicated 406 on the ARMS screen and one or more messages may be sent to the VSC ordering different actions to be taken, such as shutting down the main vacuum system and employing a back-up vacuum system if the reported vacuum levels are below a specific value. If the value is within the acceptable range, the value is indicated 407 on the ARMS screen.

If the message is an acknowledge message 408, the ARMS is updated 409 to reflect the safe receipt of the previously sent message.

If the received message, at the ARMS controller, is a message indicating 410 that the vacuum system requires service, an indication of required service 411 is presented on the ARMS screen. Advantageously, the ARMS controller may send a message to a service central, using SMS or TCP/IP, so that the service central can arrange for the service of the vacuum system to take place.

Figure 5:
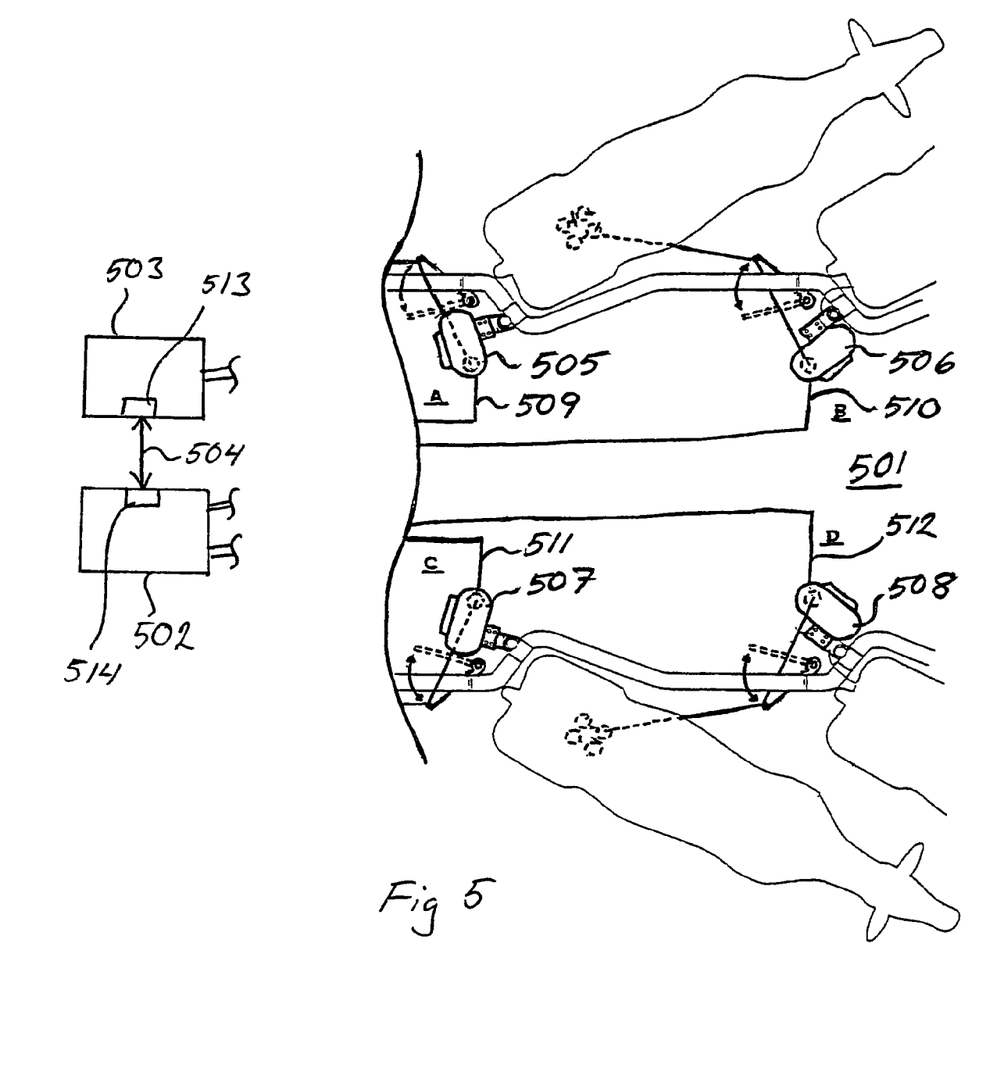
FIG. 5 shows a milking pit comprising four milking points according to a preferred embodiment of the invention.

FIG. 5 shows an automatic milking system with a milking pit 501, of which only a part is shown, a milking system controller 502 and a vacuum system controller 503 according to a preferred embodiment of the invention. The milking system controller 501 and the vacuum system controller 503 are in communication with each other through communications means 504 schematically depicted. The milking system controller 502 comprises signal transceiver means 514 and the vacuum system controller comprises corresponding signal transceiver means 513. Said communication means 504 is arranged to send and receive messages to and from the milking system controller 502 and the vacuum system controller 503. The milking system controller 502 and the vacuum system controller 503 will respond to received messages by performing different actions, as discussed above.

Four milking points A, B, C and D are shown in FIG. 5. It is clear that a general milking pit may contain more milking points than four. Each milking point comprises a milking point controller 505, 506, 507 and 508 for controlling various milking parameters relating to each milking point, such as measuring milk flow or amount, activating take off etc. Each milking point controller 505, 506, 507 and 508 is connected to the milking system controller 502 by communication means 509, 510, 511 and 512, respectively. Each milking point controller may thus send information to the milking system controller 502, for instance regarding the present status (milking, washing, take off, no operation etc.), fault indication, amount of milk withdrawn, milk flow etc. Thus, the milking system controller 502 will have information relating to all milking points 505, 506, 507 and 508 in the milking pit. The milking system controller is more over connected to gates (not shown) and other devices, such as a washing machine, for monitoring their status, receiving information or sending orders. For instance, the opening of a specific gate may indicate that milking is to be commenced, or the milking system controller may order the washing machine to start washing.

According to this preferred embodiment of the invention, the milking system controller 502 may receive information from each milking point 505, 506, 507 and 508 that all milking points are empty, that is, there are no animals present to be milked. The milking system controller thus orders the vacuum system controller to reduce the vacuum level to the stand-by vacuum level to save energy. When a gate (not shown) is opened to let in a new batch of animals to be milked, the milking system controller 502 receives information regarding the status of the gate and orders the vacuum system controller 503 to increase the vacuum level from the stand-by level to the milking level.

When washing is to be started the milking system controller 502 orders the washing machine (not shown) to start washing after ordering the vacuum system controller 503 to set the vacuum motor speed to a washing vacuum speed. Alternatively the washing machine may send a message to the milking system controller before starting washing, in which case the milking system controller 502 will respond with an order to the vacuum system controller 503 to increase the vacuum motor speed.

If a milking point 505, 506, 507 or 508 reports low vacuum levels to the milking system controller 502, alternatively if the milking system controller 502 itself register low vacuum levels, it may order the vacuum system controller 503 to use a second back-up vacuum pump and motor (not shown) and indicate the fault on a suitable media.

It will be obvious that the invention may be varied in a plurality of ways. Such variations are not to be regarded as a departure from the scope of the invention. All such modifications as would be obvious to one skilled in the art are intended to be included within the scope of the appended claims.

The invention claimed is:

1. An automatic milking system comprising a vacuum pump arrangement, wherein said automatic milking system comprises a milking system controller arranged to control milking system parameters and said vacuum pump arrangement comprises a vacuum system controller for controlling vacuum system parameters, comprising:

communication means coupled to said vacuum system controller and to said milking system controller for establishing communication between said vacuum system controller and said milking system controller, said milking system controller comprises signal transmitting means for transmitting a message to said vacuum system controller, said vacuum system controller comprises signal receiving means for receiving said message from said milking system controller, and said vacuum system controller is arranged to change at least one of said vacuum system parameters depending on said received message, wherein said milking system controller is arranged to send a message to said vacuum system controller in dependence of a first milking system parameter, said message is an order to reduce the vacuum Level to a stand-by vacuum level, which is substantially lower than a milking vacuum level, and said first milking system parameter is a parameter indicating that no animal is present in the automatic milking system.

2. The automatic milking system according to claim 1, wherein said vacuum system controller comprises signal transmitting means for sending a message relating to at least one of said vacuum system parameters to said milking system controller, and said milking system controller comprises signal receiving means for receiving said message.

3. The automatic milking system according to claim 1, wherein said automatic milking system is a fully automatic robotic milking system for automatic application of teat cups to an animal.

4. The automatic milking system according to claim 2, wherein said automatic milking system comprises vacuum measurement means for measuring a vacuum level in the milking system, at least one of said vacuum system parameters is relating to a vacuum level as measured in said vacuum pump arrangement, and said milking system controller comprises means for taking an appropriate measure if the difference between said vacuum measured in the milking system and said vacuum as indicated by said parameter is greater than a predetermined value.

5. The device according to claim 2, wherein said milking system controller is arranged to receive said vacuum system parameters and take an appropriate measure if any of said vacuum system parameters deviates more than a predetermined value from a given set point.

6. The device according to claim 1, wherein said message is an order to increase or decrease the speed of a vacuum pump motor.

7. The device according to claim 6, wherein said message is sent a predetermined time before a respective increase or decrease of air in-flow to the milking system is expected.

8. An automatic milking system comprising a vacuum pump arrangement, wherein said automatic milking system comprises a milking system controller arranged to control milking system parameters and said vacuum pump arrangement comprises a vacuum system controller for controlling vacuum system parameters, comprising:

communication means coupled to said vacuum system controller and to said milking system controller for establishing communication between said vacuum system controller and said milking system controller, said milking system controller comprises signal transmitting means for transmitting a message to said vacuum system controller, said vacuum system controller comprises signal receiving means for receiving said message from said milking system controller, and said vacuum system controller is arranged to change at least one of said vacuum system parameters depending on said received message, wherein said milking system controller is arranged to send a message to said vacuum system controller in dependence of a first milking system parameter, said message is an order to increase the vacuum level from a stand-by vacuum level, which is substantially lower than the milking vacuum level, and said first milking system parameter is a parameter indicating that an animal is present in the automatic milking system.

9. The automatic milking system according to claim 8, wherein said vacuum system controller comprises signal transmitting means for sending a message relating to at least one of said vacuum system parameters to said milking system controller, and said milking system controller comprises signal receiving means for receiving said message.

10. The automatic milking system according to claim 9, wherein said automatic milking system comprises vacuum measurement means for measuring a vacuum level in the milking system, at least one of said vacuum system parameters is relating to a vacuum level as measured in said vacuum pump arrangement, and said milking system controller comprises means for taking an appropriate measure if the difference between said vacuum measured in the milking system and said vacuum as indicated by said parameter is greater than a predetermined value.

11. The device according to claim 9, wherein said milking system controller is arranged to receive said vacuum system parameters and take an appropriate measure if any of said vacuum system parameters deviates more than a predetermined value from a given set point.

12. The automatic milking system according to claim 8, wherein said automatic milking system is a fully automatic robotic milking system for automatic application of teat cups to an animal.

13. The device according to claim 8, wherein said message is an order to increase or decrease the speed of a vacuum pump motor.

14. The device according to claim 13, wherein
said message is sent a predetermined time before a respective increase or decrease of air in-flow to the milking system is expected.

15. An automatic milking system comprising a vacuum pump arrangement, wherein said automatic milking system comprises a milking system controller arranged to control milking system parameters and said vacuum pump arrangement comprises a vacuum system controller for controlling vacuum system parameters, comprising:
communication means coupled to said vacuum system controller and to said milking system controller for establishing communication between said vacuum system controller and said milking system controller,
said milking system controller comprises signal transmitting means for transmitting a message to said vacuum system controller,
said vacuum system controller comprises signal receiving means for receiving said message from said milking system controller, and
said vacuum system controller is arranged to change at least one of said vacuum system parameters depending on said received message, wherein
said automatic milking system comprises several milking points, each of which comprises a cluster of teat cups and a milking point controller,
each of said clusters of teat cups is arranged to be applied to teats of a respective animal,
each of said milking point controllers being arranged to initiate take-off of said teat cups from said teats, and
each of said milking point controllers being connected to said milking system controller.

16. The device according to claim 15, wherein said milking system controller is arranged to send a message to said vacuum system controller ordering said vacuum system controller to reduce the vacuum level to a stand-by vacuum level if each of said milking point controllers reports that no animal is present for milking.

17. The automatic milking system according to claim 15, wherein
said vacuum system controller comprises signal transmitting means for sending a message relating to at least one of said vacuum system parameters to said milking system controller, and
said milking system controller comprises signal receiving means for receiving said message.

18. The automatic milking system according to claim 17, wherein
said automatic milking system comprises vacuum measurement means for measuring a vacuum level in the milking system,
at least one of said vacuum system parameters is relating to a vacuum level as measured in said vacuum pump arrangement, and
said milking system controller comprises means for taking an appropriate measure if the difference between said vacuum measured in the milking system and said vacuum as indicated by said parameter is greater than a predetermined value.

19. The device according to claim 17, wherein said milking system controller is arranged to receive said vacuum system parameters and take an appropriate measure if any of said vacuum system parameters deviates more than a predetermined value from a given set point.

20. The automatic milking system according to claim 15, wherein said automatic milking system is a fully automatic robotic milking system for automatic application of teat cups to an animal.

21. The device according to claim 15, wherein said message is an order to increase or decrease the speed of a vacuum pump motor.

22. The device according to claim 21, wherein
said message is sent a predetermined time before a respective increase or decrease of air in-flow to the milking system is expected.

* * * * *